United States Patent Office 3,382,132
Patented May 7, 1968

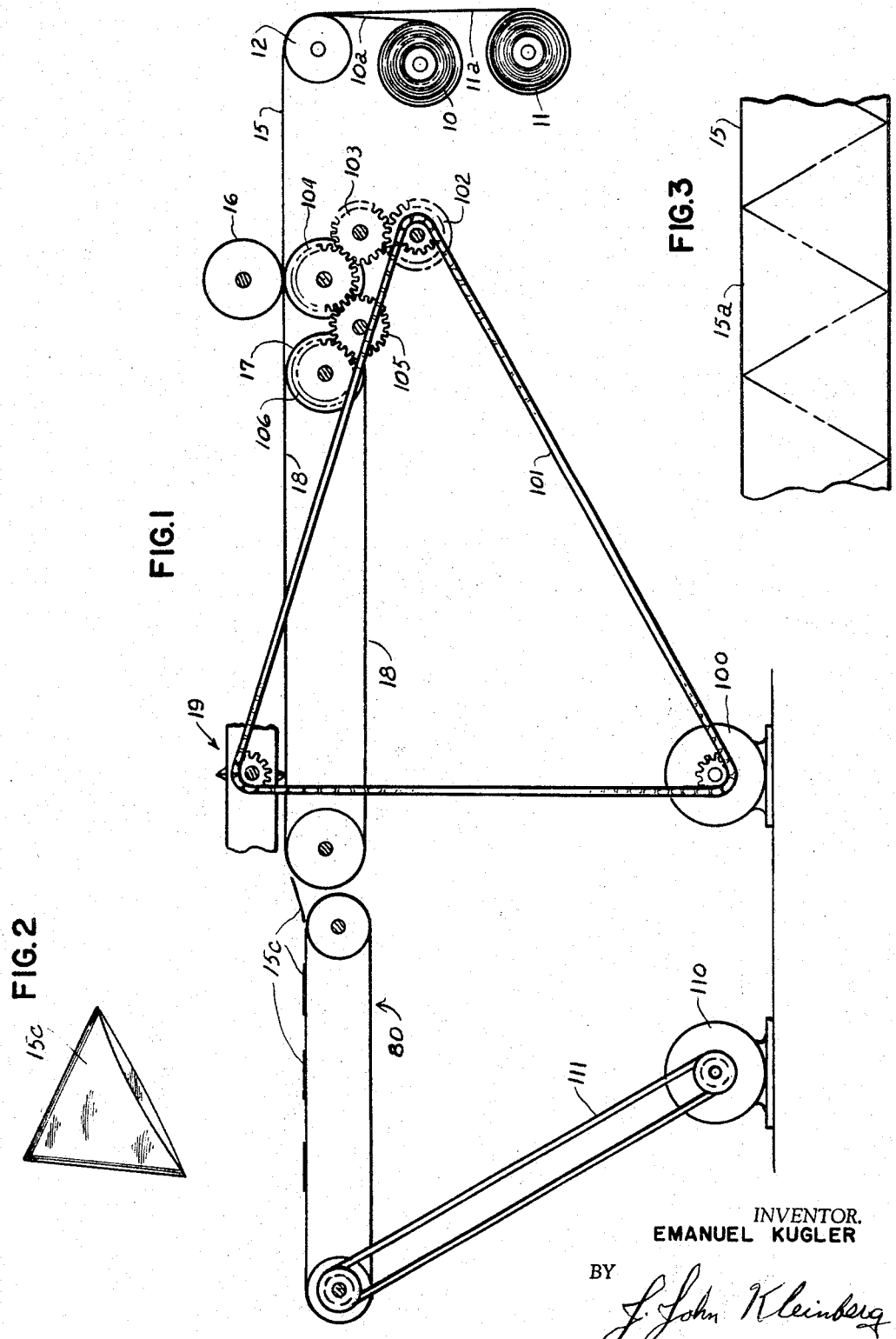

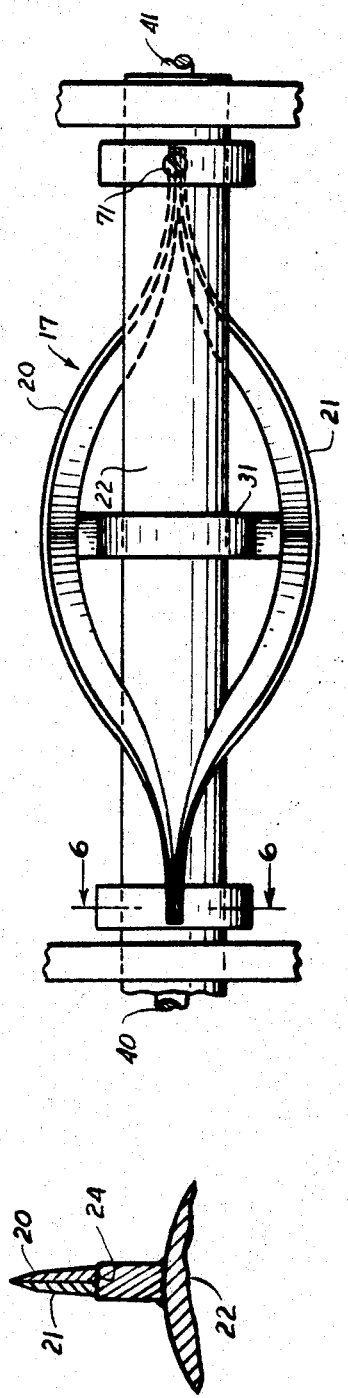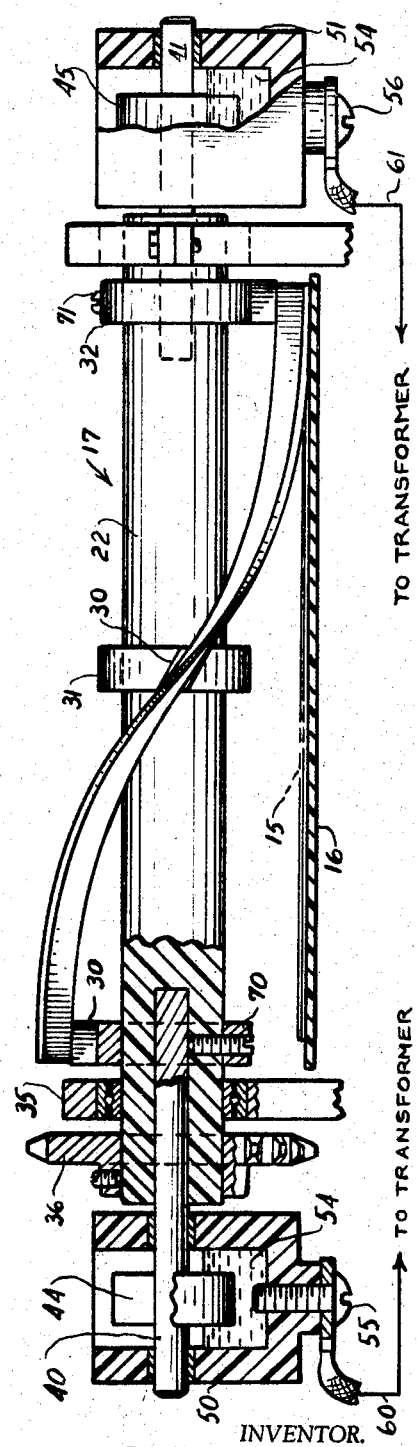

3,382,132
APPARATUS FOR MAKING A TAPERED BAG
Emanuel Kugler, 124 Richmond Place,
Lawrence, N.Y. 11559
Filed June 14, 1966, Ser. No. 477,465
1 Claim. (Cl. 156—515)

ABSTRACT OF THE DISCLOSURE

Apparatus for producing triangular shaped bags from two superposed, unattached plastic sheets wherein appropriately oriented heat seals form the two closed sides of each triangular bag and the portion of the unattached marginal edges of the sheets between these heat seals bound the opening into the interior of each bag.

---

This patent is concerned primarily with the provision of an apparatus and machine which may be utilized to form tapered bags, and in greater detail, is concerned with an apparatus for forming bags of a triangular configuration with the apex of the triangle forming the closed base of the said bag.

There have been disclosed in the prior art, several machines, methods and apparatus for producing tapered bags. Such bags have great application and would be widely utilized if they could be economically produced. To date, however, a satisfactory machine and apparatus for the production of tapered or triangular flexible containers of a thermoplastic material has not been made available.

Tapered or triangular-shaped bags would be especially useful, if available, as for the storage and shipment of spools of yarn, thread, cord, and the like, and for brushes, film, and for a great and exhaustive list of products which can only be alluded to herein.

It is a cardinal object of this invention, therefore, to provide a machine and apparatus for the ready and quick production of tapered or triangular-shaped flexible packages formed of heat-sealable material.

It is another primary object of this invention to set forth a continuous technique for the forming of heat-sealable material flexible packages.

Yet another object and accomplishment of this invention is the provision of a more readily accessible and adaptable technique for forming flexible bags.

A further purpose and accomplishment of this invention is the provision of an apparatus and technique that may be utilized to make generally available tapered or triangular bags, never heretofore considered to be commerically available, at a relatively moderate cost.

Still further, this invention is directed to the provision of an improved mass-production technique for bags.

The above objects, and others, are accomplished merely by providing a rotary multiple-bladed contour knife which can intermittently pass over two layers of thermoplastic material, continuously forming the same into triangular or tapered bags.

Yet another function and accomplishment of this invention is to provide an apparatus for forming bags that will produce at an increased rate along improved mass-production techniques.

Essentially, the objects of this invention and others are accomplished by providing a continuous technique for forming bags utilizing a plurality of rotary knives on a timed shaft.

The above objects of this invention, and others, are accomplished by the apparatus and machine described in detail hereinafter in the attached specification and drawings.

FIG. 1 is a side elevational view of one embodiment of the apparatus of this invention with many of the portions thereon shown diagrammatically.

FIG. 2 is a finished view of the product formed by the apparatus of FIG. 1.

FIG. 3 is a developed view of the bag strip material indicating the formation of the same into the product shown in FIG. 2.

FIG. 4 is a plan view of the knife assembly of the instant invention removed from the remainder of the apparatus.

FIG. 5 is a side elevational view of the rotary knife apparatus together with the supports and connections therefor removed from the remainder of the apparatus.

FIG. 6 is a fragmentary view taken substantially along line 6—6 of FIG. 4, showing in detail a portion of one of the knife assemblies.

Referring now in detail to the drawings, and especially to FIG. 1 thereof, here is shown, primarily diagrammatically, one embodiment of the instant invention. A pair of rolls of material 10 and 11 are situated to unwind over a roller 12 in such manner that one of the layers of material 11a immediately and exactly overlies the other layer 10a to form a double but completely non-joined layer of plastic film 15. The twin layers of material 15 are urged between a pair of draw rollers 16 and 17 in an exact timed relationship to the remainder of the apparatus as will be described in detail hereinafter. Sufficient to say, however, that the draw rollers 16 and 17 are urged together with sufficient force to control the movement of the twin layers of thermoplastic film 15 therebetween. The said film 15 is then continuouly advanced along a conveyer belt 18 until the section of the hot knife 19. The construction of the rotary hot knife is best illustrated by reference to FIGS. 4 and 5 of the drawings. As shown in FIG. 4, in the one typical described embodiment, a pair of knives 20 and 21 are situated about a shaft 22. The construction of the hot knives 20 and 21 and the shape thereof result in a continuous cut along the thermoplastic film 15 underneath to produce a desired result such as a straight tapered cut shown herein. The pair of hot knives 20 and 21 will each contain a relatively sharp edge 22 and further, will contain heating element portions 24 therewithin. Thus the hot knife and especially the pointed sections 22 thereof, will be heated to a sufficiently high temperature to sever the layers of plastic film 15 when they come in contact therewith and further, will weld together the pair of layers along their severed edges.

Electrical connections must be provided to keep a flow of current to the resistance heating elements within each of the hot knife assemblies 20 and 21.

It is contemplated that conventional commutators could, if desired, be utilized for this purpose. Such commuators have not been found to be satisfactory, however, and it is therefore desired that other and simpler means be provided. As shown in the drawings, a mercury bath or the like is provided for this purpose. The shafts 22 support the hot knives 20 and 21 by means of rings 30, 31 and 32. The shafts 22, in turn, will be supported by bearings 35, will be driven by a gear 36, and have extending conductive sections 40 and 41. The conducting sections 40 and 41 have annularly extending conductive rings 44 and 45 therearound. The said conducting rings 44 and 45 will, in turn, rest within an insulating container 40 and 51, retaining therewithin a measured amount of mercury or the like 54. A flooded member or the like 55 and 56, will extend through the insulated housing 50 and 51 to provide electrical contact through the housing to the said mercury bath 54. Suitable power connections 60 and 61 are provided from the flooded members 55 and 56 and thereforth from the mercury bath 54 to the electrical supply transformer or the like.

To recapitulate, then, current will flow from an electrical supply transformer through the mercury bath 54 into the electrically conductive shafts 40 and 41 by means of the intermediate annular rings 44 and 45. The conductive shafts 40 and 41 will be embedded within the insulating shaft 22, but will have an electrical connection to the rings 30 and 31 by means of conductive flooded members 70 and 71. It will be seen, then that a complete flow of current will be obtainable through the mercury bath 54, the conductive shafts 40, the flooded members 70 and 71, and finally, through the heated knives 20 and 21. Thus, no matter at what rate of speed the assembly and the knives 20 and 21 are rotated, a continuous supply of current will be directed to the said hot knives 20 and 21. Merely by adjusting the output of the transformer, and thereby controlling the voltage of the current therethrough, the temperature of the hot knives 20 and 21 may be accurately, consistently and reliably controlled.

Referring now to FIG. 5, the rotating hot knives 20 and 21 will continuously intersect, one portion at a time, the twin layers of thermoplastic material 15, mounted on the conveyer assembly 18 and being advanced at a controlled rate. The angle and formation of the hot knives 20 and 21, cooperating with the timing of the advance of the twin layers of material 15, will cause a predetermined line of severance and welding to appear and be formed along the said twin layers 15. By reversing and doubling back the angle of the hot knives 20 and 21 as seen in the plan view FIG. 4, a doubling back and triangular form of paper may be obtained as shown by the lines in phantom in FIG. 3.

In that the twin layers of material 15 were initially separated, the formation of bags according to that shown in FIG. 3 will result in a staggering arrangement of bags, each bag opposite to the one before, and each having one opening 15a and one closed end 15b. Additionally, it will be realized that each revolution of the hot knife assembly 19 will result in the formation of a bag as at 15c. As the bag, now severed and formed, leaves the hot knife assembly 19, it will pass on to a separately controlled conveyor 80, which may move at a rate of speed somewhat greater than that of the conveyor 18. This will result in a separation between each of the bags 15c, leaving the hot knife assembly 19. Thus the operator at the end of the conveyor 80 may easily collect by manual or automatic means the tapered bags 15c, ready for use.

In order to accurately control the relationship between the timing of the major portion of the apparatus described herein, one drive mechanism may be utilized for all or almost all of the operation.

Thus, as illustrated, a first motor 100, operating through a chain belt 101, or the like, may drive a gear 102, coupled to one of the draw rollers 104 through an intermediate gear 103. Thus the motor 100 will control the operation of the draw roller 104 and therefore the advance of the twin layers of thermoplastic material 15. The draw roller 104, in turn, will be coupled to an intermediate gear 105, to a gear 106, controlling the speed of the advance of the conveyer belt 15c. Still further, the chain belt 101 will be coupled to the gear 36 on the knife assembly (see FIG. 5) whereby the same chain belt will control the speed of rotation of the hot knife assembly 19.

Thus, it is seen that drive motor 100 controls the more critical portions of the apparatus, including the speed of the draw rollers, the speed of the conveyer 15c, together with the speed of the hot knife assembly 19.

The more rapidly advancing conveyer 80 may be controlled by a separate motor 110, operating through a second chain drive 111 or power may be taken from the main motor drive 100 through an accelerating gear connection.

Thus, it will be seen that an apparatus is set forth herein which will accomplish all of the objects set forth above, and others. The device is simple in operation and will produce the desired tapered or triangular bags as desired with great ease and with almost foolproof reliability. The apparatus will be simple and easy to operate. It is contemplated that this technique may be utilized to form almost any type of bag construction if desired. This has been found to be obtainable in view of the higher temperatures at which it is permissible to operate hot severing and welding knives at present.

The utilization of the unique mercury connectors in place of the commutators, and the construction of the hot knife assembly 20 and 21 permits the novel features of this invention.

While there are above disclosed but a limited number of embodiments of the apparatus and method of this invention, it is contemplated that still other embodiments may be constructed within the scope hereof.

Having thus described my invention and illustrated its use, what I claim as new and desire to secure by Letters Patent is:

1. Apparatus for manufacturing triangular shaped plastic bags comprising means for feeding at least two, unattached plastic sheets along a feed path and into an operative position of superposed relationship to each other with said opposite marginal edges of one said sheet in substantial alignment with said corresponding marginal edges of said other sheet and free of attachment therewith, and curved heat sealing knife elements operatively arranged on a rotatable member located along said feed path so as to alternately apply a heat seal transversely of said superposed plastic sheets oriented at a first inclined angle to said feed path and subsequently at a second inclined angle thereto so as to successively delineate triangular shaped bags in said superposed plastic sheets, whereby the alternately applied inclined heat seals are the sides of each said delineated bag and the unattached marginal edges between said heat seals bound an opening into the interior of each said bag.

References Cited

UNITED STATES PATENTS

| | | | |
|---|---|---|---|
| 2,322,796 | 6/1943 | Fentress | 339—118 |
| 2,427,485 | 9/1947 | Wilon | 339—118 |
| 3,083,757 | 4/1963 | Kraft et al. | 156—515 |
| 3,086,577 | 4/1963 | Gimple | 156—582 |
| 3,230,663 | 1/1966 | Shabram | 156—515 |
| 2,622,055 | 12/1952 | Lieder | 156—251 |

DOUGLAS J. DRUMMOND, *Primary Examiner.*